United States Patent
Sironko

(10) Patent No.: US 7,897,097 B2
(45) Date of Patent: *Mar. 1, 2011

(54) VACUUM-INFUSED FIBERGLASS-REINFORCED FENESTRATION FRAMING MEMBER AND METHOD OF MANUFACTURE

(75) Inventor: Philip T. Sironko, Perrysburg, OH (US)

(73) Assignee: Milgard Manufacturing Incorporated, Tacoma, WA (US)

( * ) Notice: Subject to any disclaimer, the term of this patent is extended or adjusted under 35 U.S.C. 154(b) by 948 days.

This patent is subject to a terminal disclaimer.

(21) Appl. No.: 11/728,741

(22) Filed: Mar. 27, 2007

(65) Prior Publication Data

US 2008/0053011 A1 Mar. 6, 2008

Related U.S. Application Data

(63) Continuation-in-part of application No. 11/513,621, filed on Aug. 31, 2006, now Pat. No. 7,749,424.

(51) Int. Cl.
*B29C 70/36* (2006.01)

(52) U.S. Cl. ......... 264/571; 264/101; 264/511; 264/544; 264/546; 264/552; 264/553; 264/570

(58) Field of Classification Search ............ 264/32, 264/544, 546, 552, 553, 570, 571, 101, 511
See application file for complete search history.

(56) References Cited

U.S. PATENT DOCUMENTS

| | | | |
|---|---|---|---|
| 2,495,640 A | 1/1950 | Muskat | |
| 2,913,036 A | 11/1959 | Smith | |
| 3,146,148 A | 8/1964 | Mitchella et al. | |
| 4,432,179 A | 2/1984 | Bachmann | |
| 4,831,781 A | 5/1989 | Morton | |
| 5,406,768 A | 4/1995 | Giuseppe et al. | |
| 5,497,594 A | 3/1996 | Giuseppe et al. | |
| 5,866,210 A | 2/1999 | Rosynski et al. | |
| 5,934,030 A | 8/1999 | McDonald | |
| 6,003,277 A | 12/1999 | Graham et al. | |
| 6,295,779 B1 | 10/2001 | Canfield | |
| 6,453,631 B1 | 9/2002 | Headrick | |

(Continued)

FOREIGN PATENT DOCUMENTS

EP   0269470   6/1988

(Continued)

*Primary Examiner* — Joseph S Del Sole
*Assistant Examiner* — Timothy Kennedy
(74) *Attorney, Agent, or Firm* — Reising Ethington PC

(57) ABSTRACT

A method of making a fenestration framing member includes providing a core of size and shape corresponding to the desired size and shape of the fenestration framing members. A fiberglass mat is placed on the core to form a fiberglass-engaged core, and resin is vacuum infused into the mat to form a fenestration framing member that includes fiberglass-reinforced resin engaging the core. The starting core and the final fenestration framing member preferably are of curved geometry lengthwise of the core and member. The step of vacuum infusing resin into the mat surrounding the core preferably is carried out by placing the fiberglass-engaged core into a vacuum enclosure, preferably a vacuum bag, and connecting the vacuum enclosure to a vacuum source and a resin source. In one embodiment of the disclosure, the mat surrounds the core so that the core is part of the fenestration framing member. In another embodiment, the mat is engaged with at least one contoured face of the core and is removed from the core following resin infusion, so that the core is not part of the fenestration framing member in this embodiment.

1 Claim, 5 Drawing Sheets

U.S. PATENT DOCUMENTS

| | | |
|---|---|---|
| 6,454,251 B1 | 9/2002 | Fish |
| 6,468,613 B1 | 10/2002 | Kitano et al. |
| 6,537,483 B1 | 3/2003 | Cartwright et al. |
| 6,586,054 B2 | 7/2003 | Walsh |
| 6,840,750 B2 | 1/2005 | Thrash et al. |
| 2002/0069604 A1 | 6/2002 | Canfield |
| 2002/0155186 A1 | 10/2002 | Walsh |
| 2002/0185785 A1 | 12/2002 | Thrash et al. |
| 2003/0019567 A1 | 1/2003 | Burpo et al. |
| 2003/0102604 A1* | 6/2003 | Mack et al. .................. 264/511 |
| 2003/0186035 A1 | 10/2003 | Cruce et al. |
| 2004/0003886 A1* | 1/2004 | Hunter .................. 156/219 |
| 2004/0051214 A1* | 3/2004 | Sheu et al. .................. 264/511 |
| 2004/0113305 A1* | 6/2004 | Geyer .................. 264/46.7 |
| 2004/0157519 A1 | 8/2004 | Goodell et al. |
| 2004/0185733 A1 | 9/2004 | Murai et al. |
| 2004/0256053 A1 | 12/2004 | Burpo et al. |
| 2005/0032594 A1 | 2/2005 | Goldsmith et al. |

FOREIGN PATENT DOCUMENTS

| | | |
|---|---|---|
| NL | 8601901 | 2/1988 |
| WO | WO 95/32849 | 12/1995 |
| WO | WO 96/40488 | 12/1996 |

* cited by examiner

US 7,897,097 B2

VACUUM-INFUSED FIBERGLASS-REINFORCED FENESTRATION FRAMING MEMBER AND METHOD OF MANUFACTURE

This application is a continuation-in-part of application Ser. No. 11/513,621 filed Aug. 31, 2006, which is now U.S. Pat. No. 7,749,424.

The present disclosure relates to manufacture of fenestration framing members (sash and/or frame), particularly fenestration rails having a curved geometry lengthwise of the rails.

BACKGROUND AND SUMMARY OF THE DISCLOSURE

A general object of the present disclosure is to provide a method of making a fenestration framing member of desired geometry lengthwise of the member, including particularly a curved geometry lengthwise of the member, for half-round, round, eyebrow-shaped, quarter-round, arched or circular vents above windows or doors, and to provide a fenestration framing member product resulting from such method.

The present disclosure embodies a number of aspects that can be implemented separately from or in combination with each other.

A method of making a fenestration framing member in accordance with one aspect of the present disclosure includes providing a core of size and shape corresponding to the desired size and shape of the fenestration framing member. A fiberglass mat is placed on the core to form a fiberglass-engaged core, and resin is vacuum infused into the mat to form a fenestration framing member that includes fiberglass-reinforced resin engaging the core. The starting core and the final fenestration framing member preferably are of curved geometry lengthwise of the core and member. The step of vacuum infusing resin into the mat surrounding the core preferably is carried out by placing the fiberglass-engaged core into a vacuum enclosure, preferably a vacuum bag, and connecting the vacuum enclosure to a vacuum source and a resin source. In one embodiment of the disclosure, the mat surrounds the core so that the core is part of the fenestration framing member. In another embodiment, the mat is engaged with at least one contoured face of the core and is removed from the core following resin infusion, so that the core is not part of the fenestration framing member in this embodiment.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
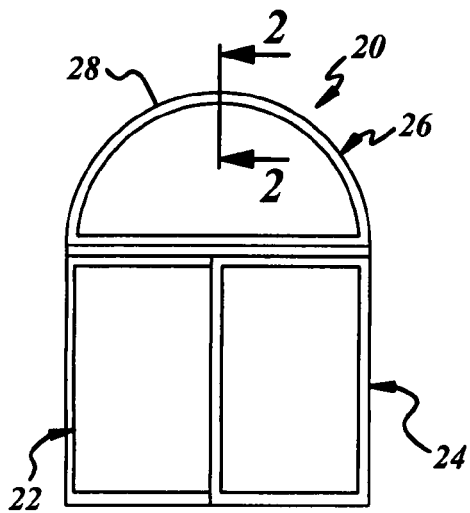
FIG. 1 is a schematic diagram of a fenestration product that includes at least one fenestration framing member in accordance with an exemplary implementation of the present disclosure.

FIG. 1 illustrates a window or door 20 that includes a pair of panels 22,24 and a half-round half vent 26 overlying panels 22,24. Vent 26 includes a curving fenestration framing member 28, which is half-round or semi-circular in this example. Framing member 28 (or 68 in FIGS. 12-14) is manufactured in accordance with the present disclosure. The linear fenestration members of vent 26 and panels 22, 24 (which can be fixed or movable sashes and/or frames) also could be manufactured in accordance with the present disclosure, although conventional manufacturing techniques for linear framing members would be less expensive. A half-round or semicircular member 28 is illustrated by way of example. Other non-linear member geometries include round, eyebrow-shaped, quarter-round, arched and circular.

Figure 2:
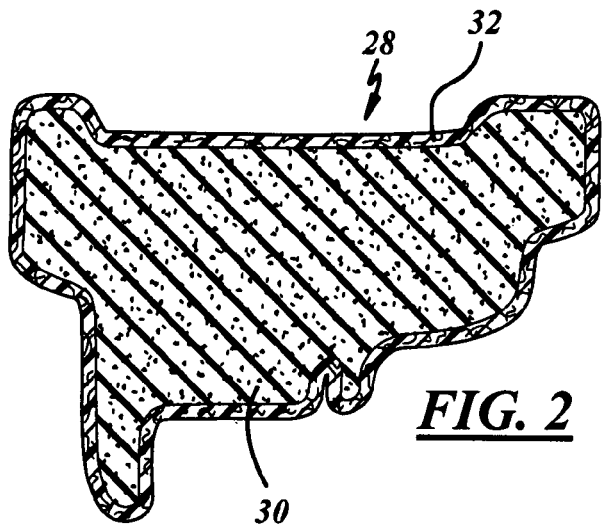
FIG. 2 is a sectional view taken substantially along the line 2-2 in FIG. 1.

FIG. 2 illustrates an exemplary cross section of member 28 as including a core 30 of desired cross section and a skin layer 32 of fiberglass-reinforced resin. There could be additional layers outside of layer 32, and there could be reinforcement within core 30, without departing from the scope of the present disclosure. Core 30 preferably is of cellular vinyl construction, most preferably PVC, although any core material could be employed in accordance with the broadest aspects of the present disclosure. The resin of layer 32 may be of any suitable material such as polyester, polyurethane, vinyl ester or any other resin used in fiberglass materials manufacture.

Figure 3:
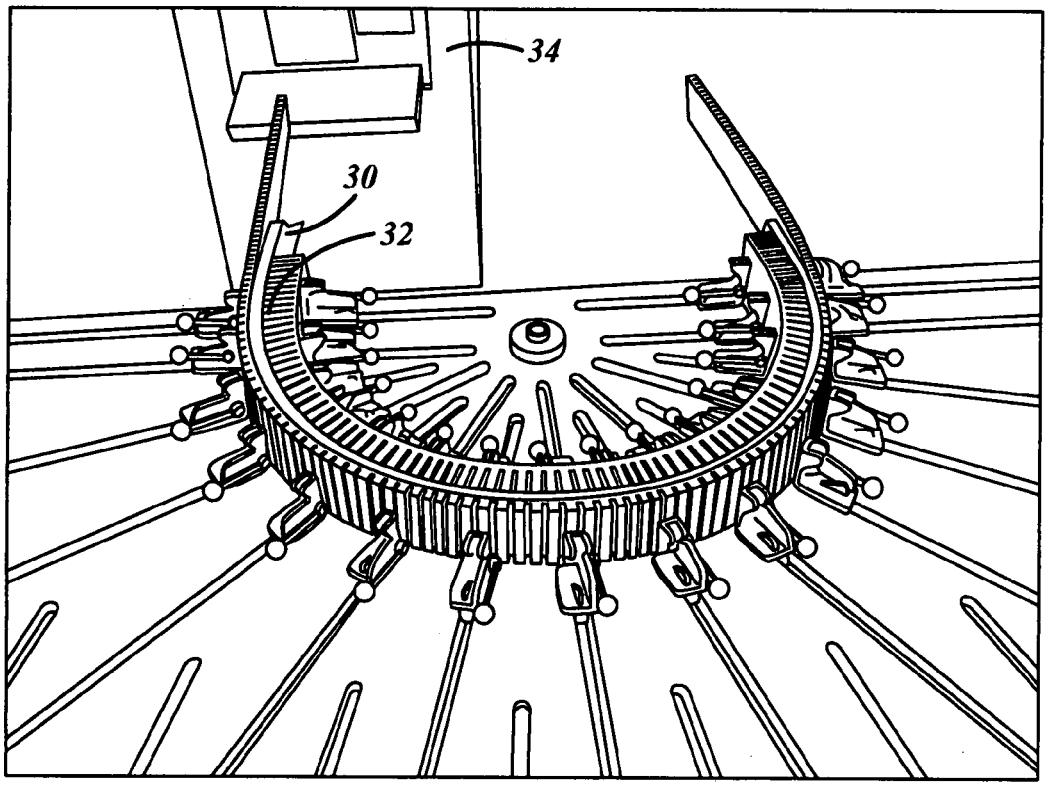
FIGS. 3-8 are schematic diagrams that illustrate manufacture of the fenestration framing member illustrated in FIG. 2 in accordance with an exemplary embodiment of the present disclosure.
Figure 4:
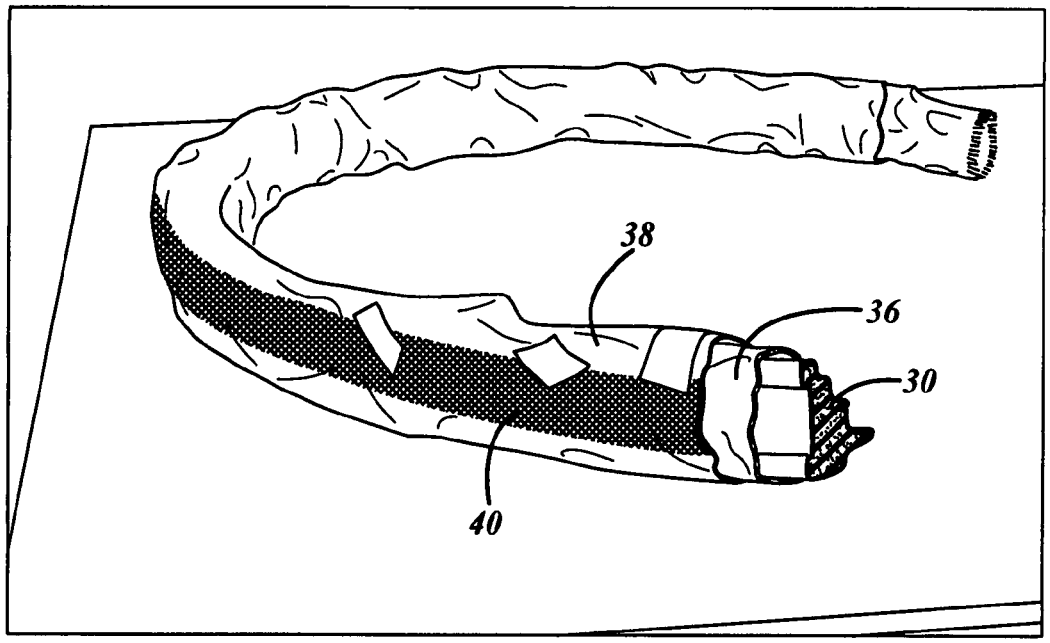
Figure 5:
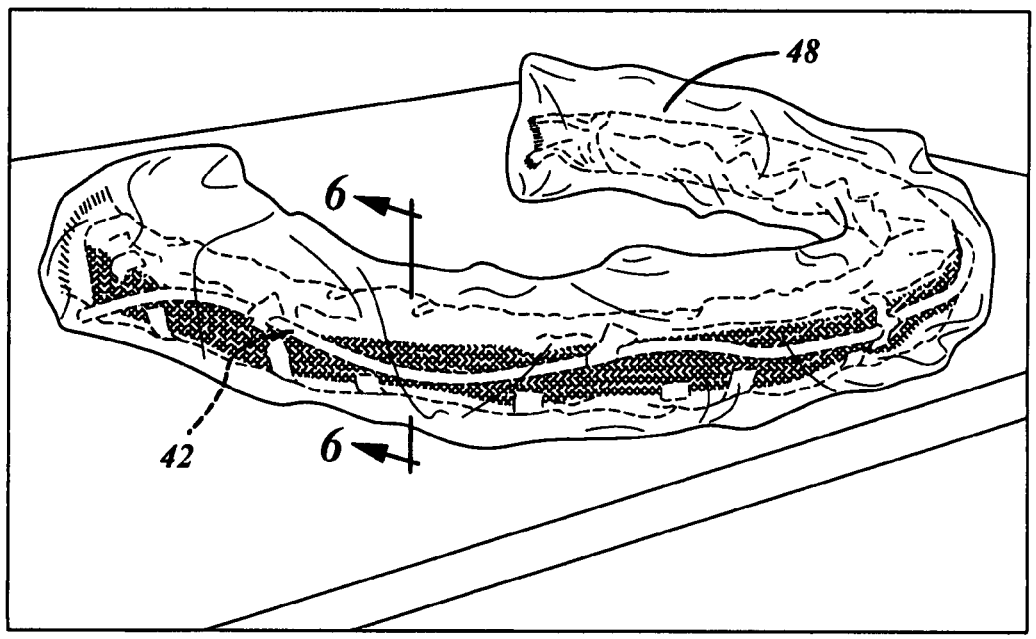
Figure 6:
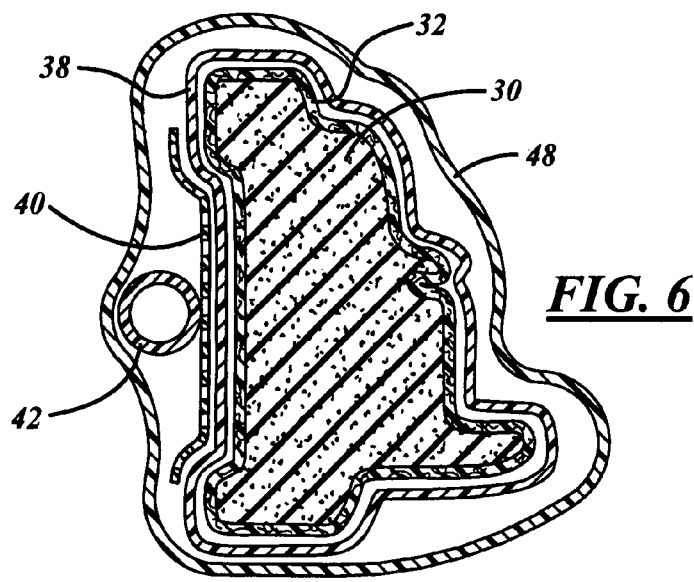

FIGS. 3-8 are schematic diagrams that illustrate manufacture of member 28 in accordance with one exemplary embodiment of the present disclosure. Referring to FIG. 3, core 30 may be heated and then placed in a fixture 32 for forming core 30 into the desired lengthwise geometry, semi-circular in this example. Core 30 can be precut and heated in an oven 34, for example, or can be drawn into fixture 32 directly from an extruder. When core 30 has cooled sufficiently to retain the desired shape, the core is removed from fixture 32 and a fiberglass mat 36 (FIG. 4) is placed around the core to form a fiberglass-enclosed core. Mat 36 preferably is a woven mat of fiberglass material that is wrapped around core 30. A peel ply 38 can then be wrapped around mat 36 to facilitate removal from mat 36 and to provide a good surface finish to mat 36 when infused by resin material. Peel ply 38, when employed, can be of any suitable porous material. A flow medium 40 can then be placed over peel ply 38. Flow medium 40, when employed, preferably is an open screen of plastic material that promotes diffusion of resin through peel ply 38 into mat 36.

Figure 7:
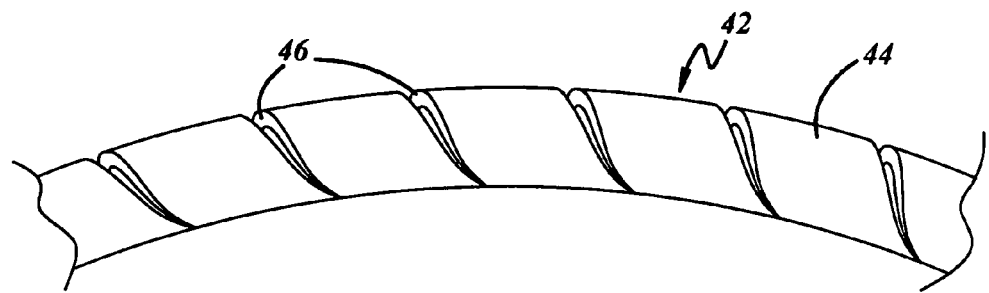
Figure 8:
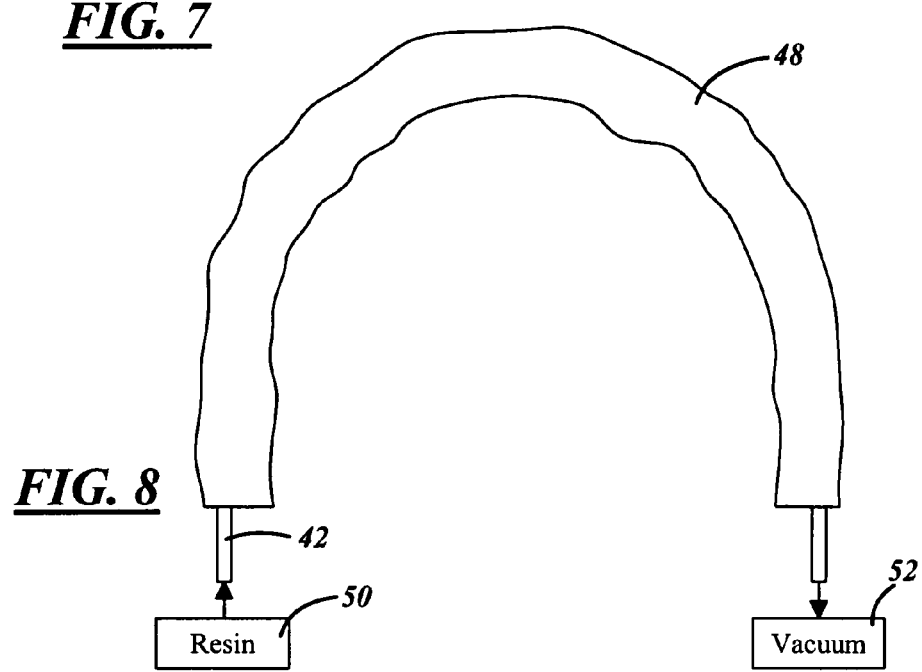
Figure 9:
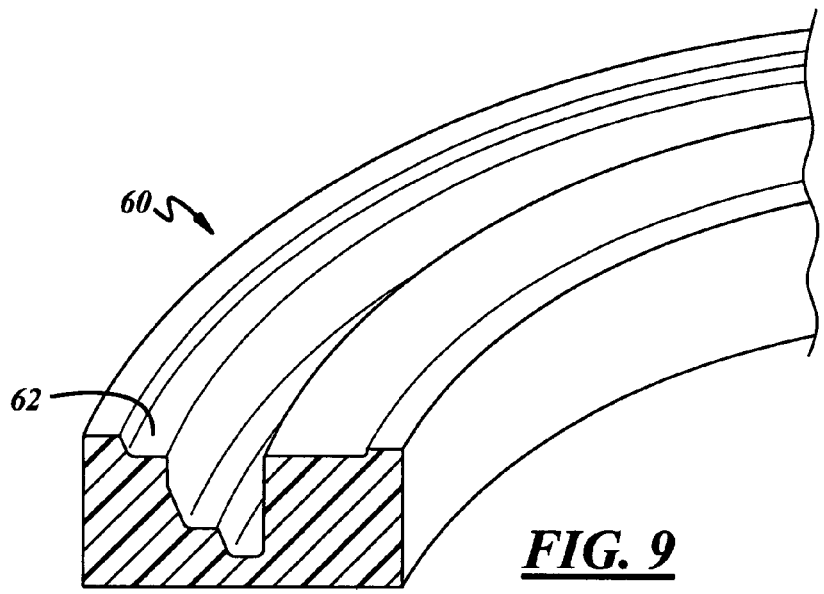
FIG. 9 is a perspective view of a core for forming a fenestration product in accordance with a second exemplary embodiment of the present disclosure.
Figure 10:
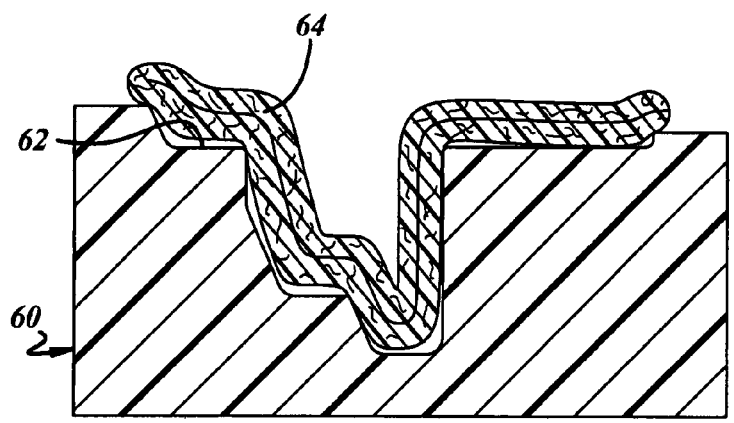
FIGS. 10-16 are schematic diagrams that illustrate manufacture of a fenestration framing member in accordance with this second exemplary embodiment of the disclosure.

A length of tubing 42 (FIGS. 5-7) preferably is then placed over flow medium 40 and suitably held in place. Tubing 42 can be of any suitable material. Exemplary tubing is illustrated in FIG. 7 as comprising a spiral wrap of plastic ribbon 44 that provides spiral apertures or gaps 46 between wraps of the ribbon, through which resin material can escape from tubing 42 into mat 36 during the vacuum infusion operation. This assembly is then enclosed in a vacuum enclosure 48 (FIGS. 5,6 and 8), which preferably is a plastic bag. The ends of tubing 42 that extend from vacuum enclosure 48 are respectively connected to a source 50 (FIG. 8) of resin and to a source 52 of vacuum. Additional components such as accumulators and valves can be employed if desired. Vacuum source 52 is energized to evacuate vacuum enclosure 48 and draw resin from source 50 into the vacuum enclosure. This resin flows through the spiral gaps 46 in tubing 42, through flow medium 40 and peel ply 38 where employed, into mat 36 surrounding core 30. The drawn vacuum also causes mat 36 tightly to surround core 30. After a suitable time, vacuum source 52 is de-energized, sources 50, 52 are disconnected from tubing 42, and the resin in mat 36 is allowed to cool and cure to form fiber-reinforced skin layer 32 (FIG. 2) closely surrounding core 30.

Figure 11:
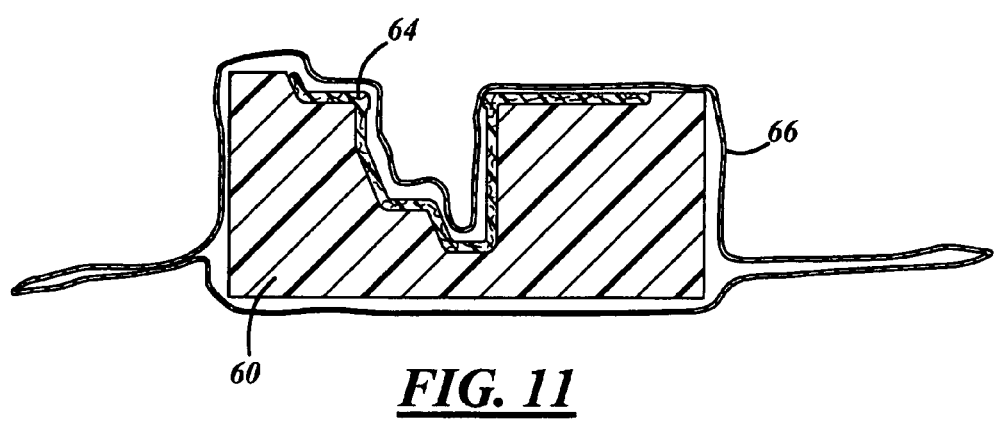
Figure 12:
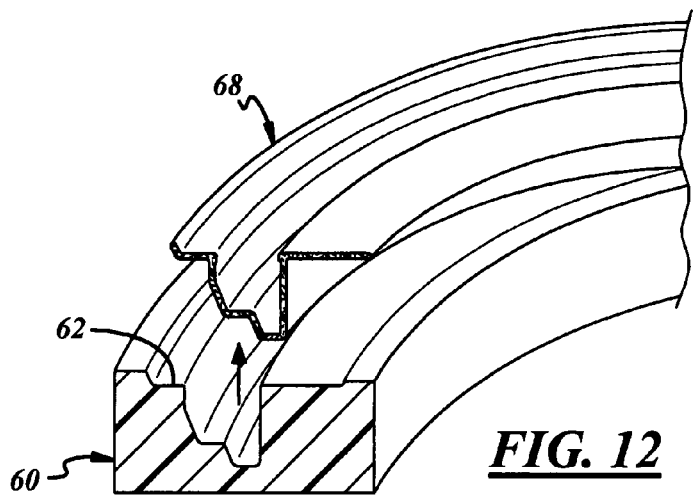
Figure 14:
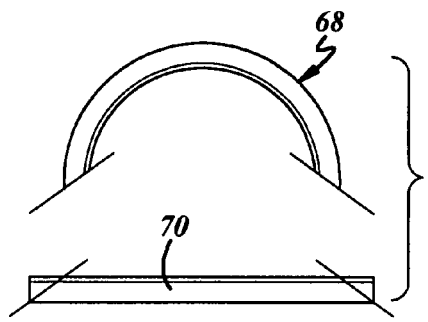
Figure 13:
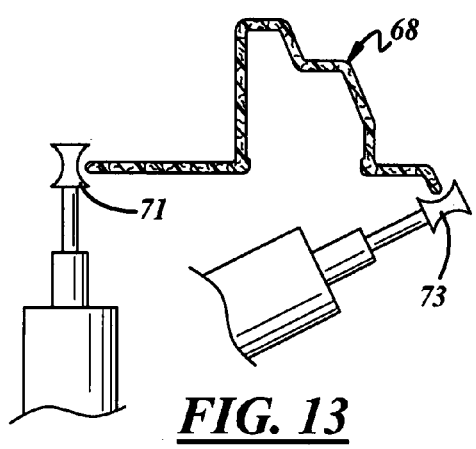
Figure 15:
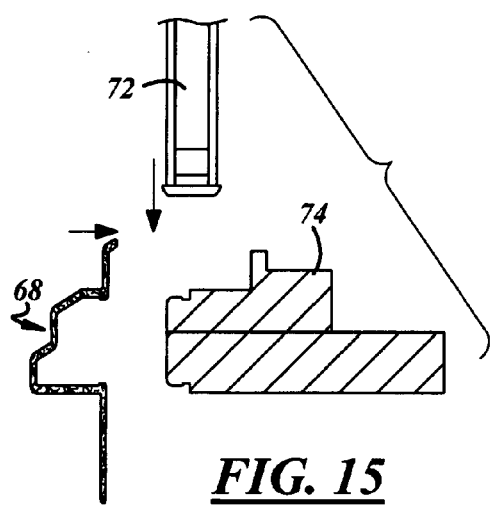
Figure 16:
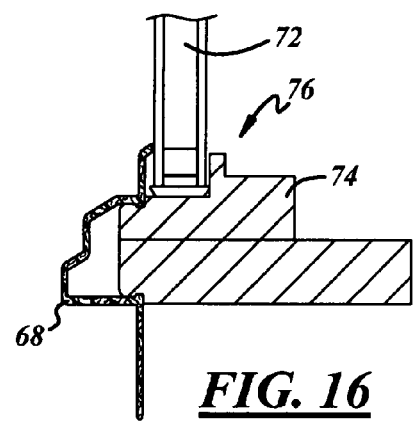

FIG. 9-16 illustrate a second exemplary embodiment of the present disclosure. A core 60 has a length corresponding to the desired length of the fenestration framing member and a cross sectional geometry with at least one face 62 contoured to correspond with the desired cross sectional geometry of the fenestration framing member. Core 60 can be of cellular PVC or other suitable construction. A fiberglass mat 64 is placed against a contoured face 62 of core 60 (FIG. 10), and the assembly of mat 64 and core 60 is placed in a vacuum bag 66 (FIG. 11). Resin is drawn into bag 66 in the manner previously described to infuse into the pores of mat 64 thereby forming a resin-impregnated fiberglass product 68 (FIG. 12). Product 68 is removed from core 60 after drying and solidification of the resin. The edges of product 68 are engaged by suitable tools 71, 73 as illustrated in FIG. 13 to remove sprue vestiges and the like, the ends can be mitered as illustrated in FIG. 14 and joined to one or more additional fenestration elements 70. A glass pane 72 and wood reinforcement 74 are joined to fenestration product 68 to form the finished architectural shape 76 (FIG. 16), which can be vent 26 in FIG. 1 for example.

There thus have been disclosed a method of making a fenestration framing member and a resulting fenestration framing member in accordance with two exemplary embodiments of the present disclosure. Other processes can by employed for vacuum infusion of resin into a fiberglass mat or layer engaged with a fenestration framing member core without departing from the scope of the present disclosure. As noted above, the process of the present disclosure is particularly suitable for manufacture of curving fenestration framing members, although the process could be implemented for manufacture of linear fenestration framing members. The core could be of any suitable material. Any suitable resin could be employed for vacuum infusion of the layer surrounding the core. The disclosure is intended to embrace these and all other modifications and variations as fall within the spirit and broad scope of the appended claims.

The invention claimed is:

1. A method of making a fenestration framing member that includes the steps of:
   (a) providing a core having a size and shape desired for said fenestration framing member,
   (b) placing a fiberglass mat against at least one contoured surface of said core to form a fiberglass-engaged core,
   (c) vacuum infusing resin into said mat of said fiberglass-engaged core to form a fenestration framing member of desired size and shape that includes fiberglass-reinforced resin engaging said core, and
   (d) removing said fenestration framing member from said core following said step (c),
   wherein said step (c) includes:
   (c1) placing said fiberglass-engaged core, including the entire cross section of said core, into a vacuum bag, and
   (c2) connecting said vacuum bag to a vacuum source and a resin source.

\* \* \* \* \*